United States Patent [19]

Deneau

[11] Patent Number: 5,387,023
[45] Date of Patent: Feb. 7, 1995

[54] REINFORCED INSTRUMENT PANEL ASSEMBLY

[75] Inventor: Kenneth S. Deneau, Troy, Mich.

[73] Assignee: Chrysler Corporation, Highland Park, Mich.

[21] Appl. No.: 228,624

[22] Filed: Apr. 18, 1994

[51] Int. Cl.⁶ ............................................. B60K 37/00
[52] U.S. Cl. ..................................... 296/72; 296/194; 296/197
[58] Field of Search .................. 296/70, 72, 191, 194, 296/196, 197; 180/90

[56] References Cited

U.S. PATENT DOCUMENTS

| | | | |
|---|---|---|---|
| 4,597,461 | 7/1986 | Köchy et al. | 296/72 X |
| 4,733,739 | 3/1988 | Lorenz et al. | 296/72 X |
| 5,005,898 | 4/1991 | Benedetto et al. | 296/72 X |
| 5,120,106 | 6/1992 | Sakurai et al. | 180/90 X |

FOREIGN PATENT DOCUMENTS 4134436  4/1992  Germany ............................... 296/72

Primary Examiner—Dean J. Kramer
Attorney, Agent, or Firm—Edward A. Craig

[57] ABSTRACT

A reinforced instrument panel assembly capable of being pre-assembled and then installed as a unit in a motor vehicle. The instrument panel assembly comprises an instrument panel and motor vehicle instruments mounted on a rigid reinforcing bar. A mounting bracket is secured to each end of the reinforcing bar. When the pre-assembled instrument panel assembly is placed inside the vehicle body and moved forwardly to the installed position, the mounting brackets contact side frame members of the vehicle body and are readily accessible to the installer so that the mounting brackets can be secured to the side frame members quickly and easily. The instrument panel assembly can be moved to a position for installation with a direct forward movement in an ergonomic manner. Hooks on the mounting brackets guide the instrument panel assembly to its installed position. When the instrument panel is installed, the reinforcing bar serves as a brace to resist the effect of side impact on the body in a collision.

4 Claims, 5 Drawing Sheets

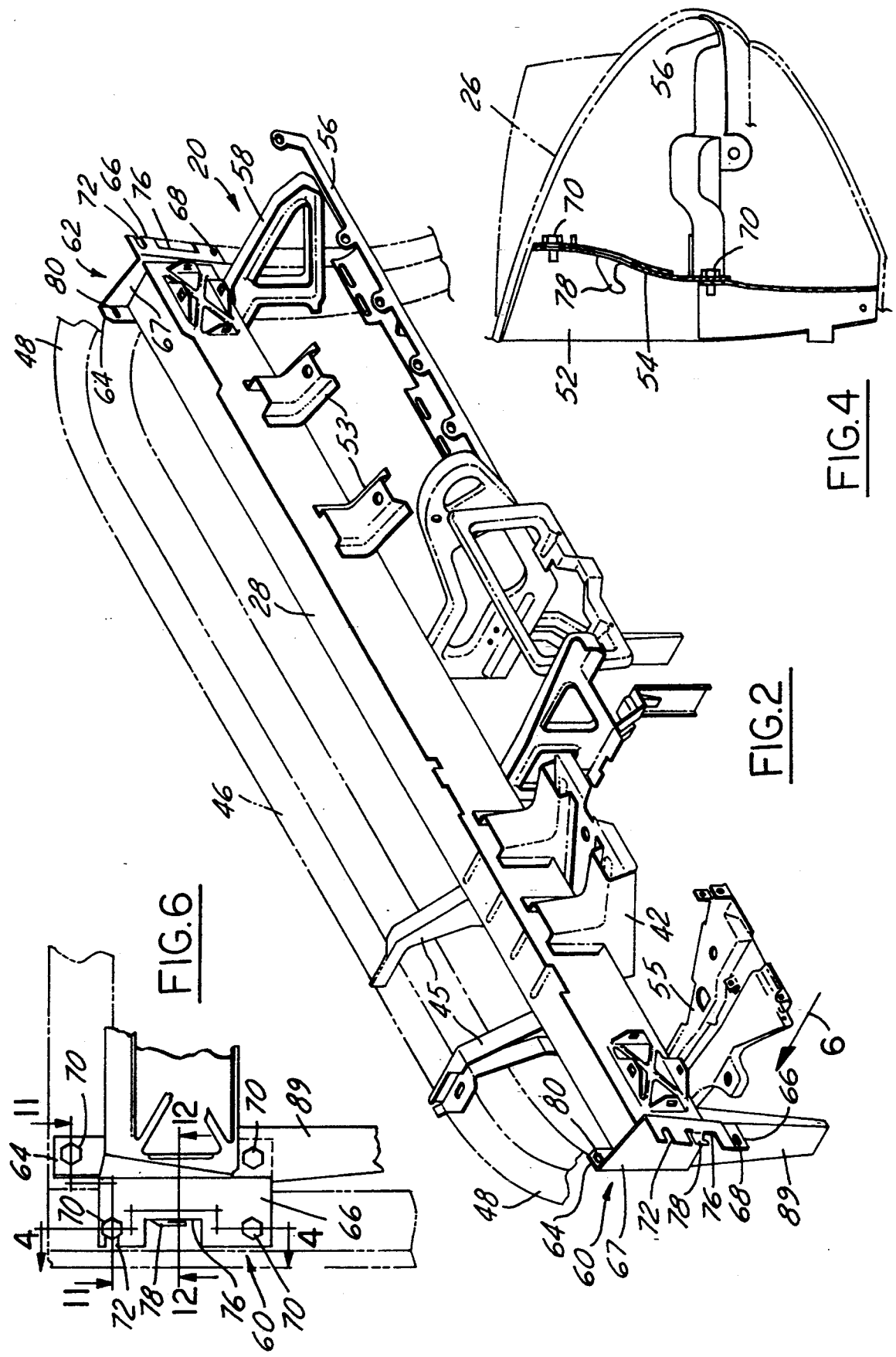

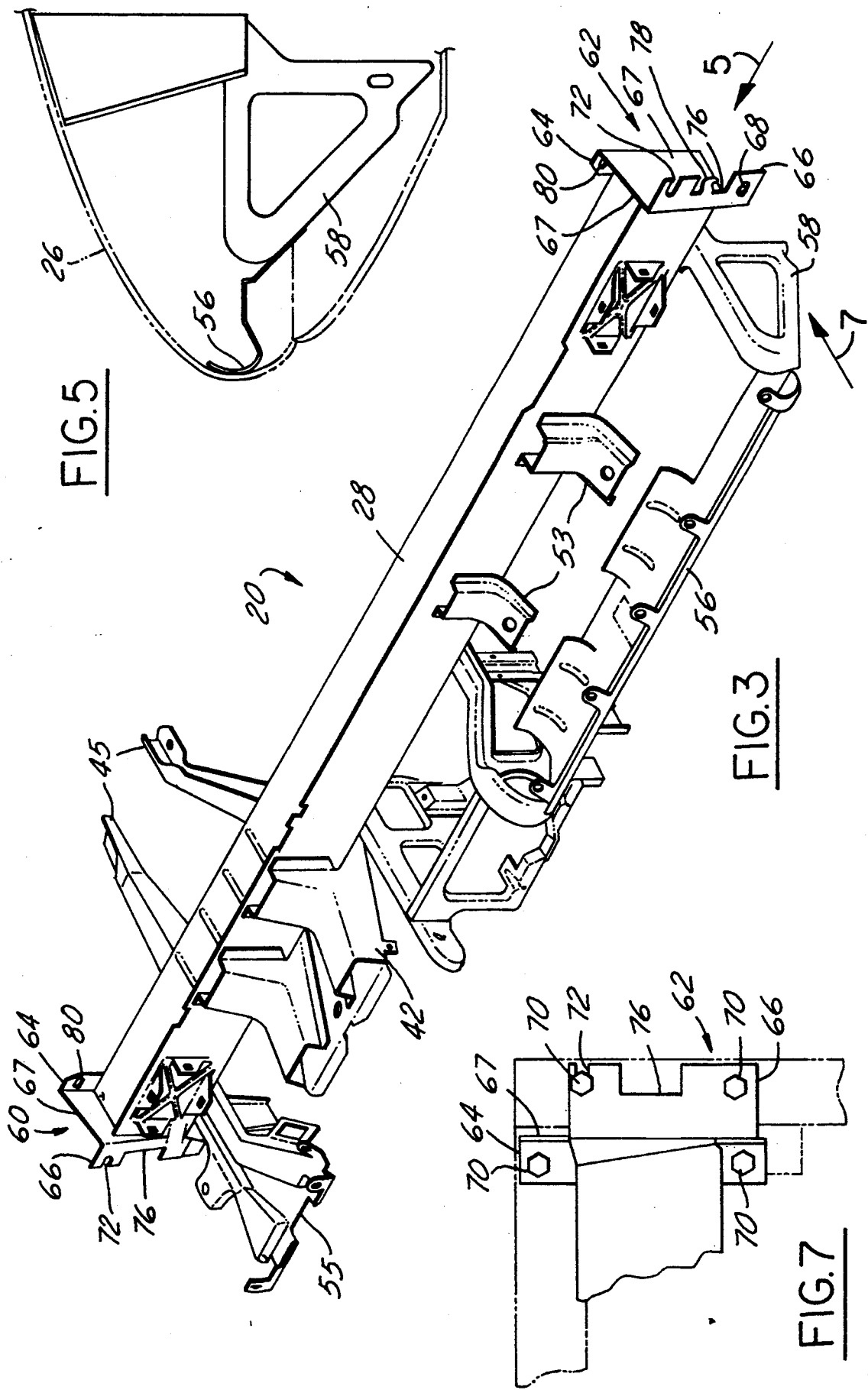

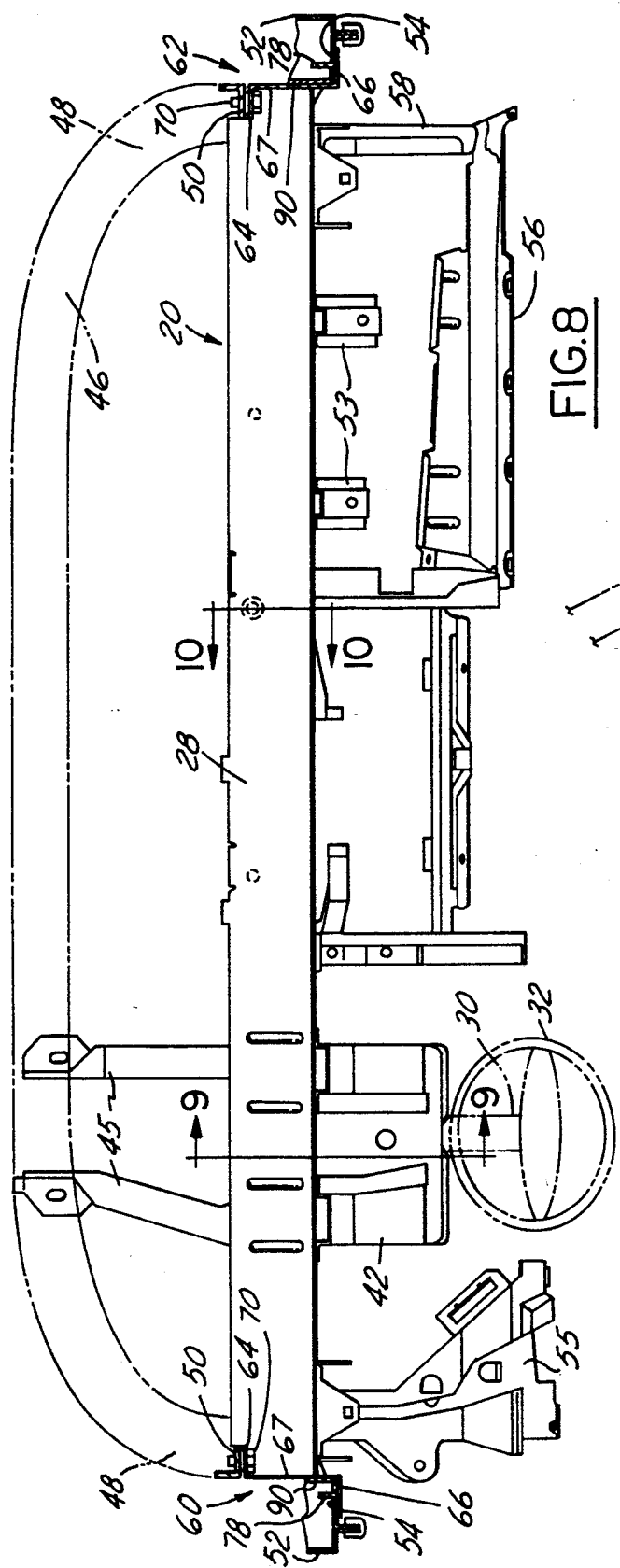
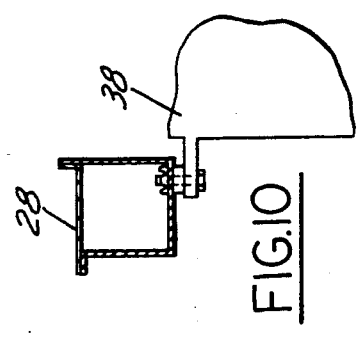
FIG.10
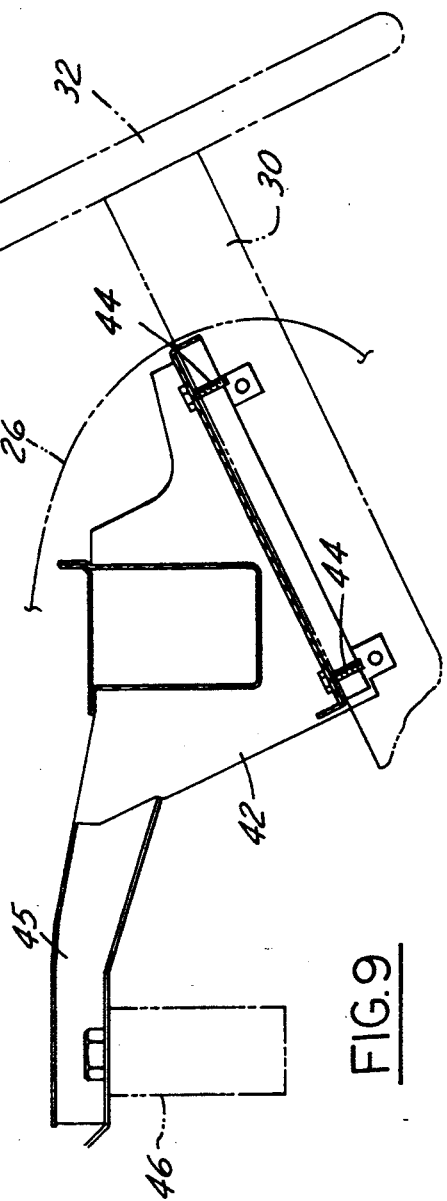
FIG.9
FIG.8

REINFORCED INSTRUMENT PANEL ASSEMBLY

This invention relates generally to a reinforced instrument panel assembly capable of being pre-assembled and then installed as a unit in an automotive vehicle.

BACKGROUND AND SUMMARY

The conventional way of installing an instrument panel and the various components associated with the instrument panel is to install them separately. This requires a person to install each individual part from a position inside the car body and is very time consuming.

In accordance with the present invention, an instrument panel assembly is made up of an instrument panel, various components or instruments associated with the instrument panel, and a reinforcing bar to which the instrument panel and components are connected. All of these parts are pre-assembled outside the car body and then the assembly is introduced as a unit into the car body and attached.

The reinforcing bar has brackets at the ends which are conveniently placed to engage side frame members of the vehicle by a simple forward movement of the instrument panel assembly. The brackets are readily accessible to the installer and can be secured to the side frame members by fasteners in a very simple and speedy operation. Since the instrument panel is pre-assembled, the working time within the vehicle is reduced to a minimum. Also, the instrument panel assembly is constructed in a way that permits it to be easily installed with a direct forward movement and then secured in an ergonomic manner. When the instrument panel is installed, the reinforcing bar serves as a brace to resist the effect of a side impact on the vehicle in a collision.

One object of this invention is to provide a reinforced instrument panel assembly having the foregoing features.

Another object is to provide a reinforced instrument panel assembly which is composed of a relatively few simple parts, is rugged and durable in use, and is relatively inexpensive to manufacture and easy to install.

Other objects, features and advantages of the invention will become more apparent as the following description proceeds, especially when considered with the accompanying drawings.

BRIEF DESCRIPTION OF THE DRAWINGS

FIG. 2 is a perspective view similar to FIG. 1 showing the reinforcing bar of the instrument panel assembly and some of the attaching brackets, but with the motor vehicle instruments and the instrument panel removed.

FIG. 3 is a perspective view similar to FIG. 2 as seen from the opposite side.

FIG. 4 is a sectional view taken on the line 4—4 in FIG. 6.

FIG. 5 is a view looking in the direction of the arrow 5 in FIG. 3.

FIG. 6 is a view looking in the direction of the arrow 6 in FIG. 2, showing one end of the instrument panel assembly attached to the car body.

FIG. 7 is a view looking in the direction of the arrow 7 in FIG. 3.

FIG. 8 is a top view showing the reinforcing bar and some of the attaching brackets, but with the instrument panel and various instruments removed.

FIG. 9 is a sectional view taken on the line 9—9 in FIG. 8.

FIG. 10 is a view partly in elevation and partly in section on the line 10—10 in FIG. 8.

DETAILED DESCRIPTION OF A PREFERRED EMBODIMENT

Figure 1:
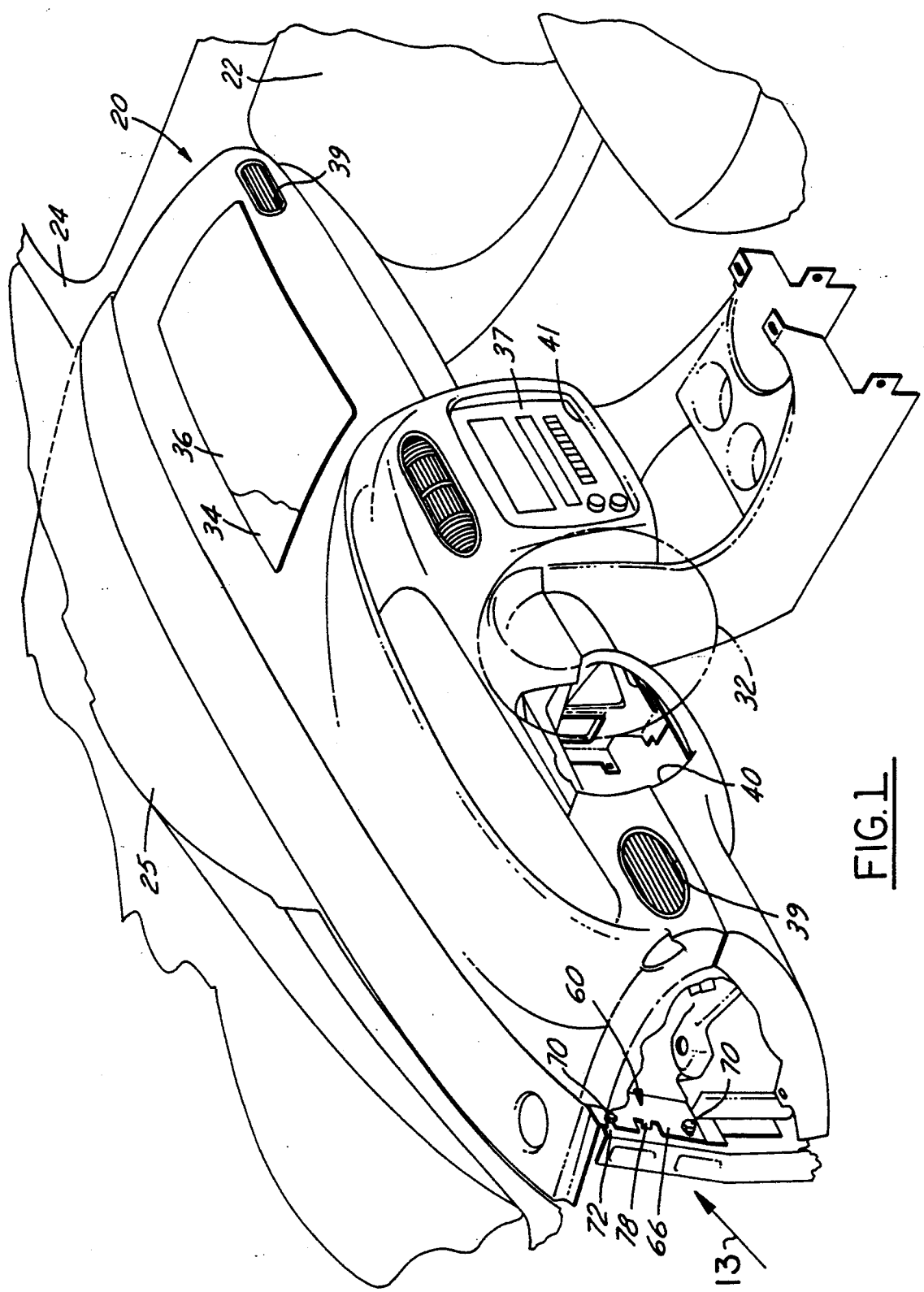
FIG. 1 is a perspective view with parts broken away showing a reinforced instrument panel assembly of this invention installed in a motor vehicle.
Figure 11:
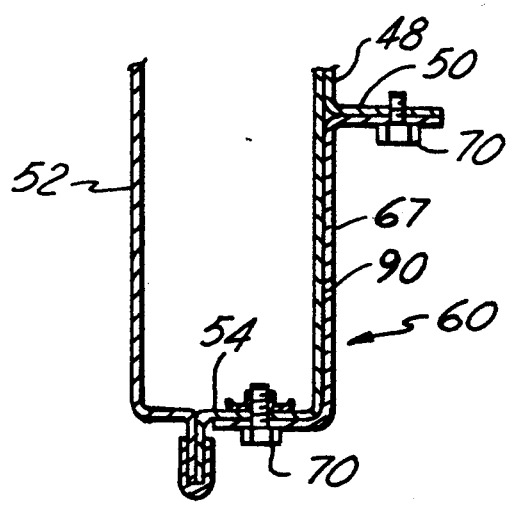
FIG. 11 is a sectional view taken on the line 11—11 in FIG. 6.
Figure 12:
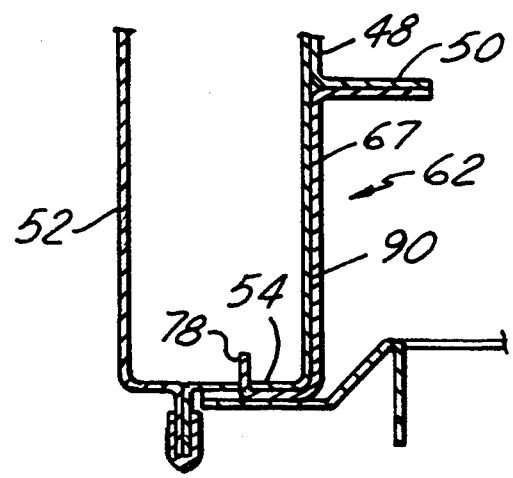
FIG. 12 is a sectional view taken on the line 12—12 in FIG. 6.
Figure 13:
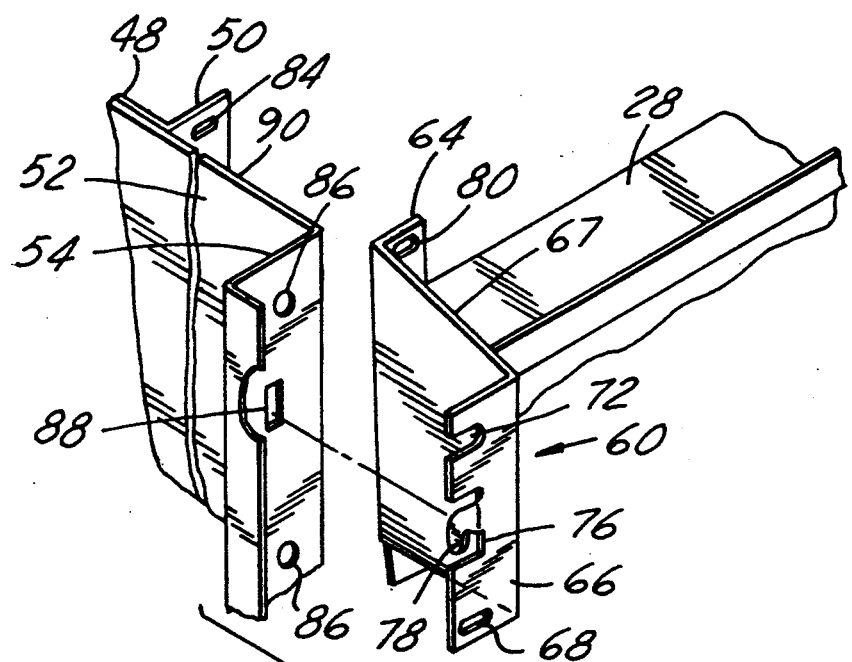
FIG. 13 is an exploded perspective view taken generally in the direction of the arrow 13 in FIG. 1.

Referring now more particularly to the drawings, an instrument panel assembly 20 is shown in FIG. 1 mounted within the passenger compartment 22 of an automotive vehicle 24 in a position extending across the front of the passenger compartment below the front windshield 25.

The instrument panel assembly comprises an elongated instrument panel 26, an elongated reinforcing bar 28 extending lengthwise of the instrument panel, and a plurality of components or instruments associated with the instrument panel and including a steering column 30 with steering wheel 32, a passenger air bag unit 34 behind a door 36 of the instrument panel 26, a radio 37, a heating, ventilating and air conditioning unit 38, as well as other components such as wiring, duct work, etc., not shown.

The instrument panel 26 may be of any suitable construction and material and preferably is made of a relatively stiff, self-supporting, flexible thermoplastic material capable of being molded to the desired configuration. It has appropriate openings, such for example as openings 39 for the air conditioning outlets, and openings 40 and 41 for the steering column 30 and radio 37.

The reinforcing bar 28 is an elongated, rigid member which may be box-shaped in cross-section as shown. Hardware rigidly mounted on the reinforcing bar includes the bracket 42 which is welded or otherwise secured to the bar and to which the steering column is attached by fasteners 44. The bracket 42 has arm extensions 45 which are adapted to be secured to the front cross frame member 46 of the vehicle body. Cross frame member 46 has its ends 48 curved rearwardly, terminating in transverse flanges 50 which are substantially vertical and perpendicular to the lengthwise dimension of the vehicle body. Adjacent to these curved ends 48 of cross frame member 46 are the side cowls 52 of the vehicle body which also have transverse flanges 54 that are substantially vertical (although somewhat curved as seen in FIG. 4) and perpendicular to the lengthwise dimension of the vehicle body and which are spaced rearwardly of and substantially parallel to the transverse flanges 50 of the cross member 46. Other hardware welded or otherwise secured to the reinforcing bar 28 includes the brackets 53 to which the passenger air bag unit 34 is secured and the bracket 55 for a fuse block (not shown). The instrument panel 26 is secured by fasteners to framing 56 on the reinforcing bar and also by suitable supports 58 for the end caps of the instrument panel welded or permanently secured to the reinforcing bar. The heating, ventilating and air conditioning unit 38 is bolted directly to the reinforcing bar 28 as shown in FIG. 10.

On one end of the reinforcing bar 28 is a mounting bracket 60 and on the other end is a mounting bracket 62. The brackets 60 and 62 are welded or otherwise rigidly secured to the ends of the reinforcing bar and are mirror images of each other. Therefore, a description of one of the brackets 60,62 will suffice for both.

Bracket 60 is Z-shaped, having a front mounting flange 64 and a rear mounting flange 66. The flanges 64 and 66 are spaced apart and are substantially parallel to each other and parallel to the lengthwise dimension of the bar. Flanges 64 and 66 are integrally connected by a web 67 which is perpendicular to the flanges 64 and 66 and rigidly attached to the end of the reinforcing bar. The flanges are substantially flat, plate-like members of uniform thickness, although the rear flange 66 is curved somewhat as seen in FIG. 4 to match the similar slight curvature of the flange 54 on the side cowl. The web 67 is also in the form of a flat plate of uniform thickness. The brackets 60,62 may initially be formed from flat metal stock, with the rear mounting flanges 66 bent laterally outwardly and the front mounting flanges 64 bent laterally inwardly.

The rear mounting flange 66 has a single hole 68 near the bottom for receiving a fastener 70, and a horizontal slot 72 near the top extending inwardly from the laterally outer edge, also for receiving a fastener 70. Between the hole 68 and the slot 72 is a vertically elongated notch 76 cut in the laterally outer edge of the rear flange. Extending from the base of the notch is a hook 78 which is bent forwardly so as to be perpendicular to the plane of the rear mounting flange 66 and substantially parallel to the web 67.

The front flange 64 has upper and lower holes 80 for receiving fasteners 70.

The instrument panel assembly 20, including the instrument panel 26, reinforcing bar 28, and all of the various components including the steering column 30, air bag unit 34, etc., is shown mounted on and secured to the curved ends 48 of the front cross frame member 46 and to the side cowls 52. More specifically, the front mounting flanges 64 of end brackets 60 and 62 are secured by fasteners 70 extending through holes 80 in the front flanges 64 thereof and into registering holes 84 in the transverse flanges 50 of the curved end portions 48 of the cross frame member 46. The rear mounting flanges 66 of the end brackets 60 and 62 are secured to the transverse flanges 54 of the side cowls 52 by fasteners 70 extending through the holes 68 and slots 72 in the rear mounting flanges 66 and into registering holes 86 in the transverse flanges 54 of the side cowls 52.

The transverse flanges 54 of the side cowls also have openings 88 which register with the hooks 78 of the end brackets 60,62 so that when the instrument panel assembly is moved forwardly into position for final attachment by the fasteners 70, the hooks 78 will first enter the openings 88 to locate the end brackets 60,62 of the instrument panel assembly in proper position for final attachment.

In use, the instrument panel assembly 20 is completely made up and assembled prior to installation in the vehicle body. In other words, the instrument panel 26 is secured to the reinforcing bar 28, and the various components or instruments associated with the instrument panel are also secured to the reinforcing bar 28 or to brackets on the reinforcing bar. These operations are all completed before the instrument panel assembly 20 or any of the parts thereof are installed in the vehicle body.

After the instrument panel assembly 20 is completely assembled outside of the vehicle body, then the instrument panel assembly 20 is introduced as a unit into the vehicle body. With a simple forward movement, guided by the hooks 78 on the end brackets 60,62 entering openings 88, the instrument panel assembly 20 is placed in its ultimate installed position with the mounting flanges 64,66 in engagement with the transverse flanges 50,54 of the cross frame member 46 and side cowls 52, and with the fastener holes in the mounting flanges 64,66 aligned with the registering holes in the transverse flanges 50,54. The instrument panel assembly is moved to this installed position with a simple forward movement by an installer positioned within the passenger compartment. The installation is then completed by driving in the several fasteners 70 required to secure the end brackets 60,62 to the frame of the vehicle body. The end brackets 60,62 are in positions readily accessible to the installer who has only to drive in the fasteners 70 to complete the installation (See FIGS. 2, 3 and 7). As seen in FIGS. 2 and 6, a depending part 89 of the bracket 55 for the fuse block extends over the lower portion of the rear face of the front flanges 64 of end bracket 60. However, this part 89 has a hole which registers with the lower hole 80 in the flange 64 so that a fastener 70 may be readily installed through the holes in part 89 and flange 64 into the hole 84 in the transverse flange 50 of the cross frame member 46.

In the final installed position, the webs 67 of the brackets overlie the inwardly facing surfaces 90 of the side cowls 52 of the body frame, in close, parallel, flush contacting relation thereto. The surfaces 90 and webs 67 are substantially vertical and parallel to the lengthwise dimension of the vehicle body. As a result, the instrument panel assembly 26, and particularly the reinforcing bar 28, serves as a brace to resist the crushing effect of a side impact on the vehicle body in the event of a collision.

I claim:

1. A reinforced instrument panel assembly capable of being pre-assembled and then installed as a unit in a motor vehicle having laterally spaced interior side frame members adjacent the front of the passenger compartment, said instrument panel assembly comprising:
   (a) an elongated instrument panel,
   (b) a plurality of motor vehicle instruments,
   (c) an elongated, rigid reinforcing bar having opposite ends and extending lengthwise of said instrument panel,
   (d) means mounting said instrument panel and said instruments on said reinforcing bar, and
   (e) a bracket secured to each end of said reinforcing bar,
   (f) said brackets each having at least one mounting flange, said mounting flanges lying in planes generally parallel to the length of said reinforcing bar and, when said instrument panel assembly is in installed position in the motor vehicle, being so disposed as to be generally upright and to extend transversely of the motor vehicle and to overlie the respective side frame members of the motor vehicle in positions readily accessible to an installer occupying the passenger compartment,
   (g) and fasteners for securing said mounting flanges to said respective side frame members,
   (h) said instrument panel assembly being installed by being moved forwardly until said mounting flanges overlie the side frame members of the motor vehicle in the aforesaid readily accessible positions,
(i) the side frame members having hook-receiving, locating openings,
(j) and said mounting flanges having hooks receivable in said respective openings of the side frame members to locate said mounting flanges when said instrument panel assembly is moved forwardly to the installed position.

2. A reinforced instrument panel assembly capable of being pre-assembled and then installed as a unit in a motor vehicle having laterally spaced interior side frame members adjacent the front of the passenger compartment, said instrument panel assembly comprising:
(a) an elongated instrument panel,
(b) a plurality of motor vehicle instruments,
(c) an elongated, rigid reinforcing bar having opposite ends and extending lengthwise of said instrument panel,
(d) means mounting said instrument panel and said instruments on said reinforcing bar, and
(e) a bracket secured to each end of said reinforcing bar,
(f) said brackets each having at least one mounting flange, said mounting flanges lying in planes generally parallel to the length of said reinforcing bar and, when said instrument panel assembly is in installed position in the motor vehicle, being so disposed as to be generally upright and to extend transversely of the motor vehicle and to overlie the respective side frame members of the motor vehicle in positions readily accessible to an installer occupying the passenger compartment,
(g) and fasteners for securing said mounting flanges to said respective side frame members,
(h) the side frame members of the motor vehicle having rearwardly facing surfaces,
(i) said mounting flanges overlying said rearwardly facing surfaces in the aforesaid readily accessible positions,
(j) the side frame members having laterally inwardly facing surfaces,
(k) and said brackets overlying said laterally inwardly facing surfaces in the installed position of said instrument panel assembly whereby said reinforcing bar serves as a brace to resist vehicle side impact.

3. A reinforced instrument panel assembly capable of being pre-assembled and then installed as a unit in a motor vehicle having laterally spaced interior side frame members provided with rearwardly facing surfaces and laterally inwardly facing surfaces and located adjacent the front of the passenger compartment, said instrument panel assembly comprising:
(a) an elongated instrument panel,
(b) a plurality of motor vehicle instruments,
(c) an elongated, rigid reinforcing bar having opposite ends and extending lengthwise of said instrument panel,
(d) means mounting said instrument panel and said instruments on said reinforcing bar, and
(e) a bracket secured to each end of said reinforcing bar,
(f) said brackets each being generally Z-shaped having spaced apart first and second mounting flanges lying in planes generally parallel to the length of said reinforcing bar and, when said instrument panel assembly is in installed position in the motor vehicle, being so disposed as to be generally upright and to extend transversely of the motor vehicle and to overlie the rearwardly facing surfaces of the respective side frame members of the motor vehicle in positions readily accessible to an installer occupying the passenger compartment,
(g) said brackets each having a web connecting said first and second flanges thereof and extending generally perpendicular to said first and second flanges, said webs overlying said laterally inwardly facing surfaces of the side frame members in the installed position of said instrument panel assembly whereby said reinforcing bar serves as a brace to resist vehicle side impact.

4. A reinforced instrument panel assembly as defined in claim 3, wherein said instrument panel assembly is installed by being moved forwardly until said first and second flanges of said brackets overlie the rearwardly facing surfaces of the side frame members of the motor vehicle in the aforesaid readily accessible positions, the side frame members have hook-receiving, locating openings, and said first bracket flanges have hooks receivable in the respective openings to locate said instrument panel assembly when it is moved forwardly to installed position.

* * * * *